(12) United States Patent
Wang

(10) Patent No.: US 7,185,868 B2
(45) Date of Patent: Mar. 6, 2007

(54) TELESCOPIC DISPLAY STAND

(75) Inventor: Sheng-Chien Wang, Taichung Hsien (TW)

(73) Assignee: Gemmy Industries Corporation, Coppell, TX (US)

( * ) Notice: Subject to any disclaimer, the term of this patent is extended or adjusted under 35 U.S.C. 154(b) by 88 days.

(21) Appl. No.: 11/028,621

(22) Filed: Jan. 5, 2005

(65) Prior Publication Data

US 2006/0145044 A1  Jul. 6, 2006

(51) Int. Cl.
*F16M 13/00* (2006.01)
(52) U.S. Cl. .................. 248/422; 248/405; 248/158; 248/127; 248/157; 248/161; 248/125.8; 248/125.1; 74/89.35
(58) Field of Classification Search ............ 248/161, 248/157, 422, 127, 158, 511, 521, 519, 125.8, 248/125.1, 405; 74/89.35; 52/111
See application file for complete search history.

(56) References Cited

U.S. PATENT DOCUMENTS 4,682,930 A * 7/1987 Hachisu ............... 414/589
5,937,699 A * 8/1999 Garrec ................. 74/89.35
6,026,970 A * 2/2000 Sturm et al. ............ 212/348
6,435,048 B1 * 8/2002 Zimmerman ........... 74/89.35
6,435,112 B1 * 8/2002 Insalaco ............. 108/147.21
2003/0136061 A1 * 7/2003 Larsen ................... 52/111
2006/0091277 A1 * 5/2006 Wang .................... 248/405

FOREIGN PATENT DOCUMENTS

WO   WO 99/52739   * 4/1998

* cited by examiner

*Primary Examiner*—A. Joseph Wujciak, III
*Assistant Examiner*—Todd M. Epps
(74) *Attorney, Agent, or Firm*—Rosenberg, Klein & Lee

(57) ABSTRACT

A telescopic display stand includes a base and a fixed tube secured on the base. A first telescopic tube and a second telescopic tube are in turn telescopically received in the fixed tube. A gear box is mounted in the first telescopic tube, and a plug is mounted in the second telescopic tube. A first threaded rod has a bottom end rotatably received in the fixed tube and threadingly extends through the gear box. A second threaded rod has a bottom end rotatably mounted in the gear box and threadingly extends through the plug. A driving unit is mounted on the gear box for driving gears in the gear box. An effigy sheath is mountable over the fixed tube and telescopic tubes. Whereby, the display stand can be automatically erected and retracted.

7 Claims, 3 Drawing Sheets

TELESCOPIC DISPLAY STAND

BACKGROUND OF THE INVENTION

1. Field of the Invention

The present invention relates to a display stand, and more particularly to a display stand constructed with a plurality of telescopic rods.

2. Description of Related Art

Large decorative displays such as a Santa Claus, Christmas tree or the like are often stood in front of shopping stores or houses as ornaments. These conventional displays must be manually assembled. Because the displays are tall, workers must use a ladder for assembling or placing other decorations. After use, the display must be manually disassembled. Therefore, it is very inconvenient and may be dangerous for the workers to assemble and decorate the displays.

Therefore, the invention provides a telescopic display stand to mitigate or obviate the aforementioned problems.

SUMMARY OF THE INVENTION

The main objective of the present invention is to provide a telescopic display stand which can be automatically erected for use and retracted for storage.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
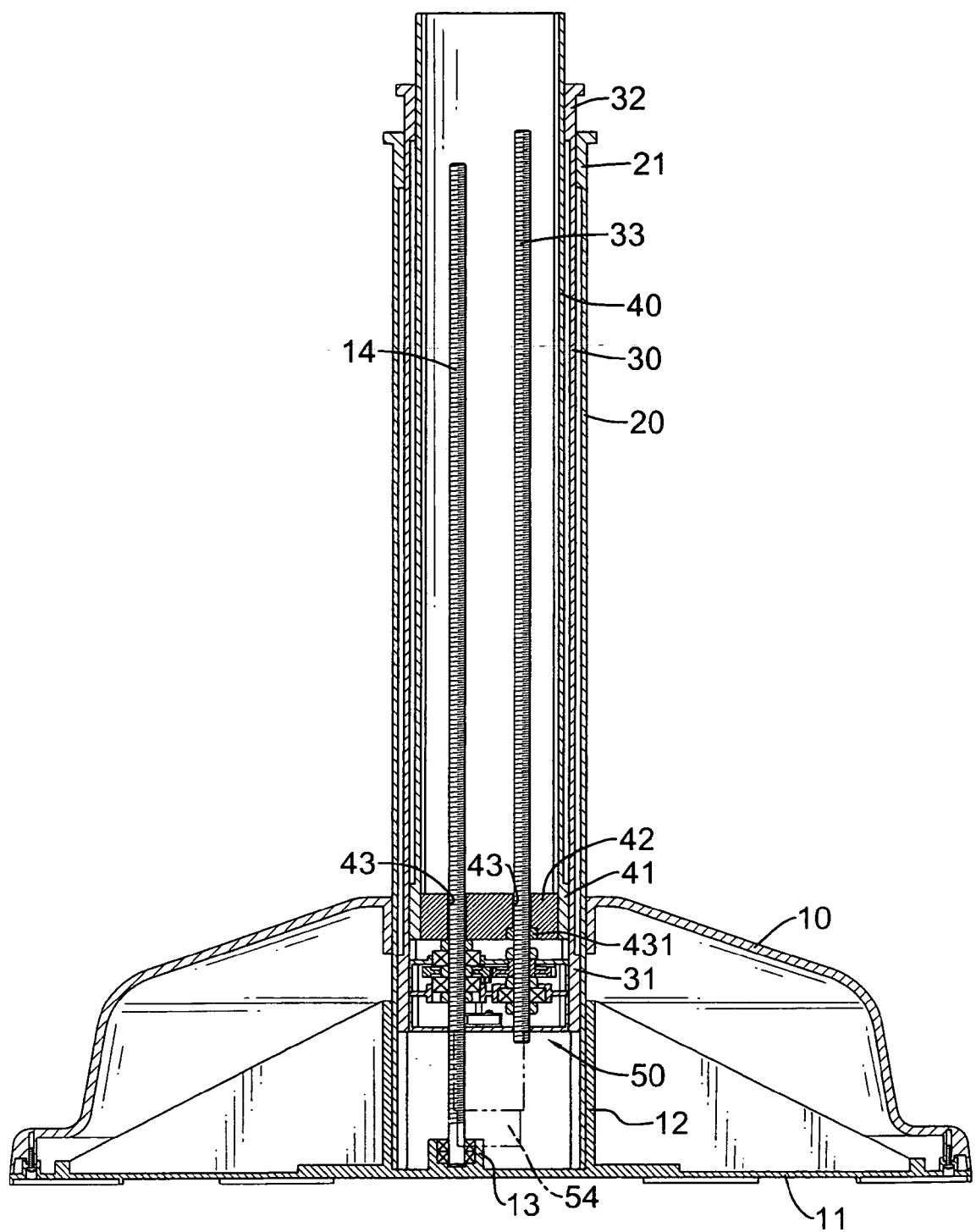
FIG. 1 is a cross sectional view of a telescopic display stand in accordance with the present invention.

With reference to FIG. 1, a telescopic display stand in accordance with the present invention has a base (10) and a fixed tube (20) secured on the base (10). A first telescopic tube (30) and a second telescopic tube (40) are in turn telescopically received in the fixed tube (20). An effigy sheath with an appearance such as a Christmas tree, Santa Claus, etc. is provided outside the fixed tube (20).

The base (10) has a bottom plate (11) formed with a bottom tube (12). The fixed tube (20) is securely received in the bottom tube (12). A first threaded rod (14) is rotatably mounted in the fixed tube (20). In this embodiment, a seat (13) is provided on the bottom plate (11) with a bearing, and the first threaded rod (14) is inserted in the bearing of the seat (13). A first inner flange (21) is formed at an inner wall of a top end of the fixed tube (20).

The first telescopic tube (30) has a first stopping flange (31) formed at an outer periphery of a bottom end thereof, and a second inner flange (32) formed at an inner wall of a top end thereof. A gear box (50) is mounted in the bottom end of the first telescopic tube (30).

Figure 4:
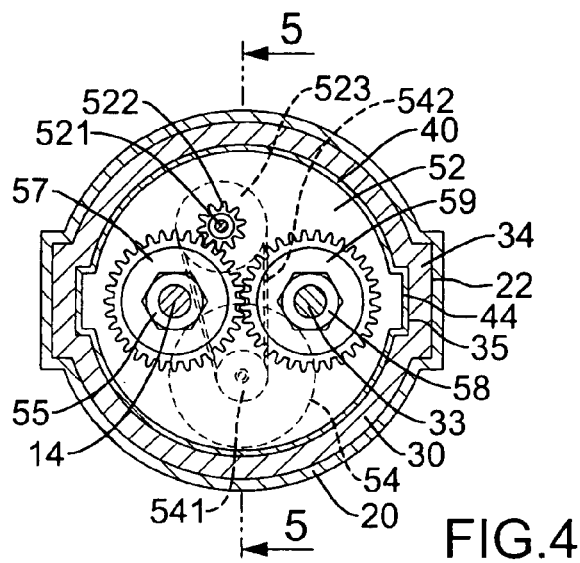
FIG. 4 is a top cross sectional view of FIG. 3 along the line "4—4"
Figure 3:
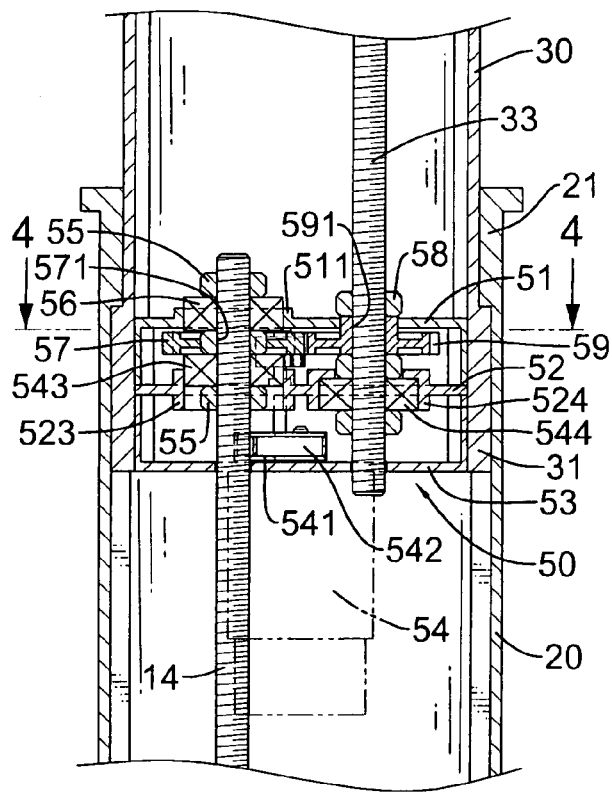
FIG. 3 is a partially enlarged cross sectional view of the telescopic display stand.
Figure 5:
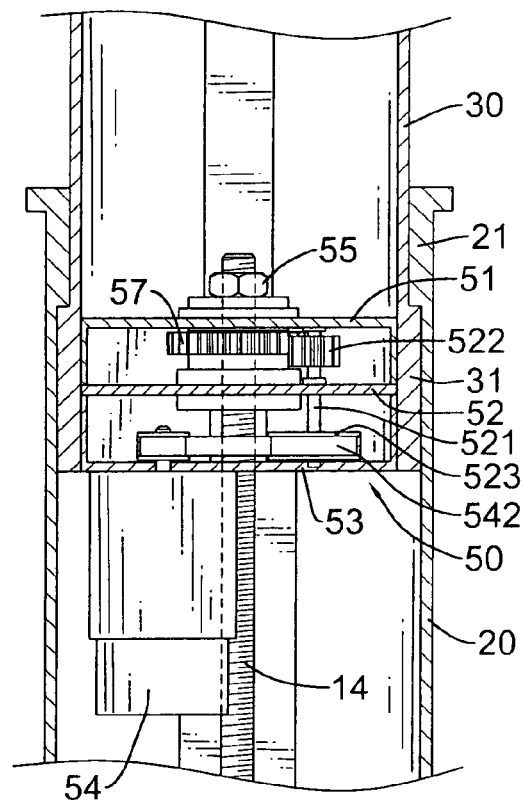
FIG. 5 is a sectional view of FIG. 4 along the line "5—5".

With reference to FIGS. 3–5, the gear box (50) has an upper housing (51) and a lower housing (53) matched to each other. A dividing plate (52) is provided between the upper housing (51) and lower housing (53). A first gear (57) and a second gear (59) are rotatably mounted in the gear box (50) and meshed with each other. A driving unit is mounted on the gear box (50) for driving the gears (57, 59). The first gear (57) has a threaded hole (571) defined therethrough, and the second gear (59) has a plain hole (591) defined therethrough.

The driving unit includes a motor (54) with an output axle extending through the lower housing (53). A first pulley (541) is fastened on the output axle of the motor (54). A shaft (521) is rotatably mounted in the dividing plate (52). A second pulley (523) is provided at a lower end of the shaft (521) and connected to the first pulley (541) by a belt (542). A pinion (522) is provided at an upper end of the shaft (521) and engaged with the first gear (57). When the motor (54) is actuated, the first pulley (541) is rotated to drive the second pulley (523) and the shaft (521). Then, the pinion (522) on the shaft (521) is rotated to drive the first gear (57) and the second gear (59).

A first bearing seat (511) is provided in the upper housing (51), and a first bearing (56) is mounted in the first bearing seat (511). A second bearing seat (523) is provided in the dividing plate (52) and aligned with the first bearing seat (511), and a second bearing (543) is mounted in the second bearing seat (523). The first gear (57) is securely provided between the first bearing (56) and second bearing (543) to let the bearings (543,56) rotate with the first gear (57). The first threaded rod (14) extends through the second bearing (543), is engaged in the threaded hole (571), and extends out from the first bearing (56). Two first nuts (55) are engaged on the first threaded rod (14) and respectively above the first bearing (56) and beneath the second bearing (543). The nuts (55) are securely attached respectively to the bearings (543, 56), such that the nuts (55) are rotated with the first gear (57). Therefore, when the first gear (57) is turned, the gear box (50) can be moved upwards/downwards along the first threaded rod (14) to extend/retract the first telescopic tube (30) out/in the fixed tube (20).

A third bearing seat (524) is provided in the dividing plate (52) and aligned with the second gear (59). A third bearing (544) is mounted in the third bearing seat (524). A second threaded rod (33) has a bottom end extending through the plain hole (591) of the second gear (59) and the third bearing (544). Two second nuts (58) are engaged on the second threaded rod (33) and respectively above and beneath the second gear (59) to fix the second threaded rod (33) with the second gear (59). Therefore, the second threaded rod (33) is rotated along with the second gear (59).

Figure 2:
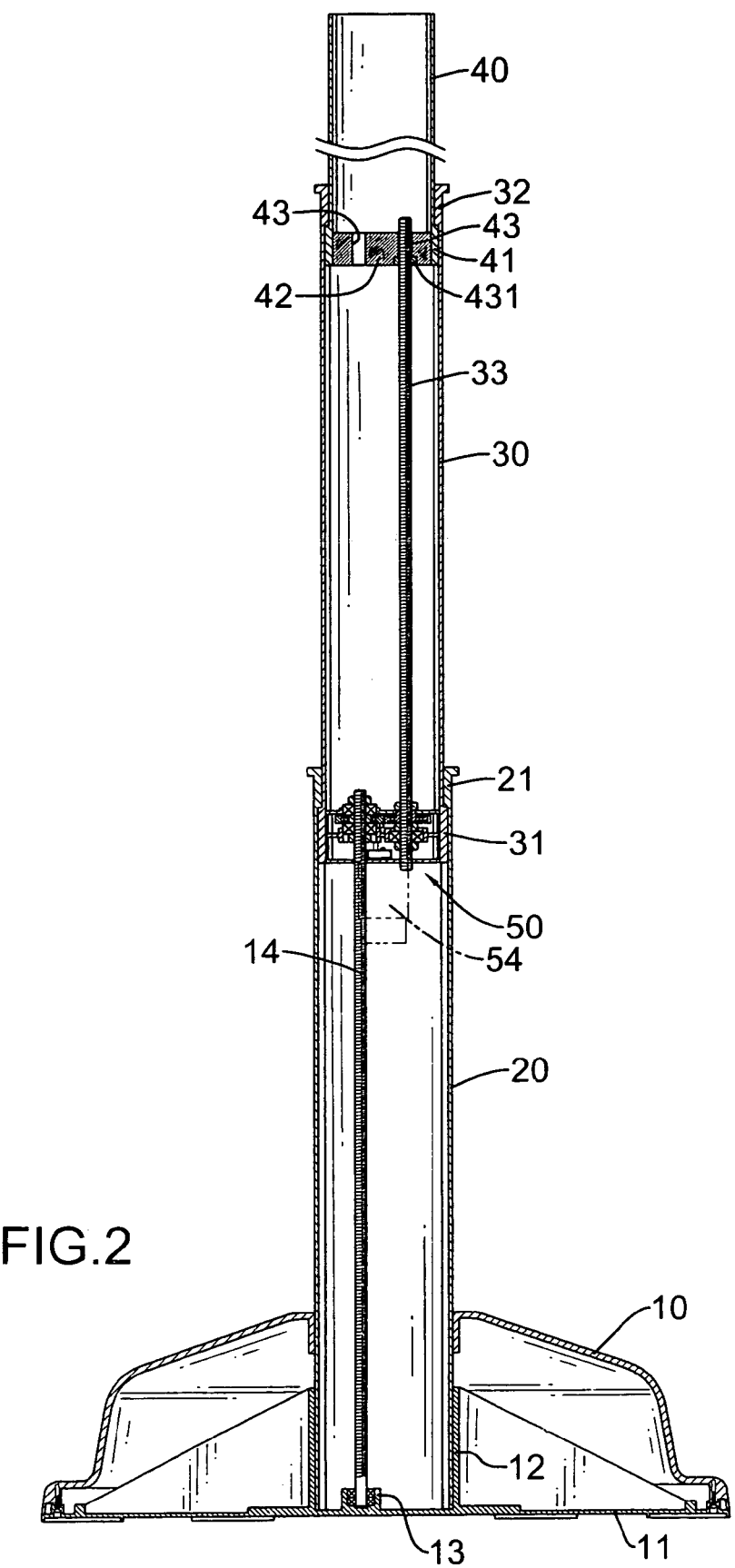
FIG. 2 is a sectional view of the telescopic display stand in an erected status.

With reference back to FIGS. 1–2, the second telescopic tube (40) has a second stopping flange (41) formed at an outer periphery of a bottom end thereof. A plug (42) is secured in the bottom end of the second telescopic tube (40) and has two openings (43) defined therethrough, and the first and second threaded rods (14, 33) respectively extend through the openings (43). A third nut (431) is securely received in one of the openings (43) in which the second threaded rod (33) is inserted, and engaged on the second threaded rod (33). When the second threaded rod (33) is turned along with the second gear (59), the third nut (431) can be moved upwards/downwards along the second threaded rod (33) to extend/retract the second telescopic tube (40) out/in the first telescopic tube (30).

Summarily, when the motor (54) is actuated to drive the pulleys (541, 523), the first gear (57) is driven by the pinion (522) to rotate, and the first telescopic tube (30) can be moved along with the gear box (50) upwards until the first stopping flange (31) abuts the first inner flange (21). At the same time, the second gear (59) is driven by the first gear (57) to rotate, and the second telescopic tube (40) can be moved upwards until the second stopping flange (41) abuts the second inner flange (32). Therefore, the display stand is erected automatically and the effigy sheath can be extended over the stand. When the motor is actuated reversely, the telescopic tubes (30, 40) are retracted into the fixed tube (20) to contract the display stand.

With reference to FIG. 4, the fixed tube (20) further has at least one first channel (22) longitudinally defined in the inner wall thereof, and the first telescopic tube (30) has at least one first rib (34) longitudinally formed at the outer periphery thereof and located in the first channel (22). At least one second channel (35) is longitudinally defined through the inner wall of the first telescopic tube (30), and at least one second rib (44) is formed at the outer periphery of the second telescopic tube (40) and located in the second channel (35). Therefore, the first and second telescopic tubes (30,40) can be guided to smoothly extend and retract without sway.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A telescopic display stand comprising:
    a base (10) having a bottom plate (11), and a bottom tube (12) formed on the bottom plate (11);
    a fixed tube (20) securely received in the bottom tube (12);
    a first telescopic tube (30) telescopically received in the fixed tube (20);
    a second telescopic tube (40) telescopically received in the first telescopic tube (30);
    a gear box (50) mounted in the first telescopic tube (30), the gear box (50) having a first gear (57) and a second gear (59) rotatably mounted in the gear box (50) and meshed with each other, a threaded hole (571) defined through the first gear (57), and a plain hole (591) defined through the second gear (59);
    a plug (41) mounted in the second telescopic tube (40), the plug (41) having two openings (43) defined through the plug (42) respectively aligned with the threaded hole (571) and the plain hole (591);
    a first threaded rod (14) having a bottom end rotatably received in the fixed tube (20), and threadingly extending through the threaded hole (571) of the first gear (57);
    a second threaded rod (33) having a bottom end secured in the second gear (59) and extending through one of the openings (43);
    a threading member (431) engaged on the second threaded rod (33) and securely received in the opening (43) in which the second threaded rod (33) extends; and
    a driving unit mounted on the gear box (50) being connected to the first gear (57) having a motor (54) with an output axle extending in the gear box (50), a first pulley (541) mounted on the output axle, a shaft (521) rotatably mounted in the gear box (50), a second pulley (523) mounted on the shaft (521) and connected to the first pulley (541) by a belt (542), and a pinion (522) mounted on the shaft (521) and engaged with the first gear (57).

2. The telescopic display stand as claimed in claim 1, wherein the base (10) has a seat (13) formed on the bottom plate (11), and the bottom end of the first threaded rod (14) is rotatably mounted in the seat (13) by a bearing.

3. The telescopic display stand as claimed in claim 1, wherein the gear box (50) has an upper housing (51) and a lower housing (53) matched to each other, a dividing plate (52) provided between the upper housing (51) and lower housing (53), a first bearing seat (511) provided in the upper housing (51), a first bearing (56) mounted in the first bearing seat (511), a second bearing seat (523) provided in the dividing plate (52) and aligned with the first bearing seat (511), and a second bearing (543) mounted in the second bearing seat (523);
    the first gear (57) is provided between the first bearing (56) and second bearing (543) and securely connected to the first and second bearings (543, 56);
    the first threaded rod (14) extends through the second bearing (543), is engaged in the threaded hole (571), and extends out from the first bearing (56); and
    two first nuts (55) are engaged on the first threaded rod (14), respectively above the first bearing (56) and beneath the second bearing (543) and securely connected respectively to the first and second bearings (543, 56).

4. The telescopic display stand as claimed in claim 3, wherein the gear box (50) has a third bearing seat (524) provided in the dividing plate (52) and aligned with the second gear (59), a third bearing (544) mounted in the third bearing seat (524); and
    the bottom end of the second threaded rod (33) extends through the plain hole (591) of the second gear (59) and the third bearing (544); and
    two second nuts (58) are engaged on the second threaded rod (33) and respectively above and beneath the second gear (59) to fix the second threaded rod (33) with the second gear (59).

5. The telescopic display stand as claimed in claim 1, wherein the threading member (431) is a nut.

6. The telescopic display stand as claimed in claim 1, wherein the fixed tube (20) further has at least one first channel (22) longitudinally defined in the inner wall thereof, and the first telescopic tube (30) has at least one first rib (34) longitudinally formed at the outer periphery thereof and located in the first channel (22).

7. The telescopic display stand as claimed in claim 5, wherein the first telescopic tube (30) has at least one second channel (35) longitudinally defined through the inner wall thereof, and the second telescopic tube (40) has at least one second rib (44) formed at the outer periphery thereof and located in the second channel (35).

* * * * *